US010069862B2

(12) United States Patent
Sawhney et al.

(10) Patent No.: US 10,069,862 B2
(45) Date of Patent: Sep. 4, 2018

(54) TECHNIQUES FOR PREDICTING AND PROTECTING SPEARPHISHING TARGETS

(71) Applicant: Symantec Corporation, Mountain View, CA (US)

(72) Inventors: Sanjay Sawhney, Cupertino, CA (US); Kevin Alejandro Roundy, El Segundo, CA (US)

(73) Assignee: SYMANTEC CORPORATION, Mountain View, CA (US)

( * ) Notice: Subject to any disclaimer, the term of this patent is extended or adjusted under 35 U.S.C. 154(b) by 11 days.

(21) Appl. No.: 13/840,920

(22) Filed: Mar. 15, 2013

(65) Prior Publication Data

US 2014/0283035 A1 Sep. 18, 2014

(51) Int. Cl.
H04L 29/06 (2006.01)
G06F 21/57 (2013.01)

(52) U.S. Cl.
CPC ........ H04L 63/1483 (2013.01); G06F 21/577 (2013.01); H04L 63/1433 (2013.01); H04L 63/1441 (2013.01)

(58) Field of Classification Search
CPC ........ G06F 21/00; G06F 9/455; G06F 21/577; H04L 63/1416; H04L 63/20;
(Continued)

(56) References Cited

U.S. PATENT DOCUMENTS 8,752,172 B1 * 6/2014 Dotan ................. H04L 63/1483
709/206
9,239,908 B1 * 1/2016 Constantine ............ G06F 21/00
2007/0022202 A1 1/2007 Finkle et al.
2007/0226796 A1 * 9/2007 Gilbert .................... G06F 21/55
726/22

(Continued)

FOREIGN PATENT DOCUMENTS

| CN | 102882739 A | 1/2013 |
| JP | 2002-251374 A | 9/2002 |
| WO | WO-2007/016869 A2 | 2/2007 |

OTHER PUBLICATIONS

Dinoor, Shlomi, "We fix Stupid!," Shlomi's Parking Spot, Aug. 15, 2011, 2 pages, [Retrieved from internet:<URL:http://shlomidinoor.blogspot.com/>].

(Continued)

*Primary Examiner* — Ashok Patel
*Assistant Examiner* — Quazi Farooqui
(74) *Attorney, Agent, or Firm* — Meyertons Hood Kivlin Kowert and Goetzel PC; Rory D. Rankin

(57) ABSTRACT

Techniques for predicting and protecting spearphishing targets are disclosed. In one particular exemplary embodiment, the techniques may be realized as a system for predicting and protecting spearphishing targets. The system may comprise one or more processors communicatively coupled to a network. The one or more processors may be configured to identify one or more potential spearphishing targets based on information from an organization, receive additional information associated with the one or more potential spearphishing targets and the organization from publicly available sources, determine a threat level of a spearphishing attack on the one or more potential spearphishing targets based on the information from the organization and the additional information, and generate a report of the one or more potential spearphishing targets and the threat level associated with the one or more potential spearphishing targets.

14 Claims, 5 Drawing Sheets

(58) Field of Classification Search
CPC .............. H04L 63/1483; H04L 63/1433; H04L 63/1441; H04L 29/06
USPC ......... 726/1, 22–25; 713/168–176, 182–186, 713/202
See application file for complete search history.

(56) References Cited

U.S. PATENT DOCUMENTS

| | | | |
|---|---|---|---|
| 2007/0250930 A1 | 10/2007 | Aziz et al. | |
| 2008/0114837 A1 | 5/2008 | Biggs et al. | |
| 2008/0134330 A1 | 6/2008 | Kapoor et al. | |
| 2010/0049975 A1* | 2/2010 | Parno ................. | H04L 63/08 713/168 |
| 2010/0251369 A1* | 9/2010 | Grant ..................... | 726/23 |
| 2011/0197275 A1* | 8/2011 | Chasin .................. | H04L 12/585 726/22 |
| 2011/0209193 A1* | 8/2011 | Kennedy ................. | 726/1 |
| 2012/0240185 A1* | 9/2012 | Kapoor ................. | H04L 63/1425 726/1 |
| 2013/0031630 A1 | 1/2013 | Krishnamurthy et al. | |
| 2013/0145465 A1* | 6/2013 | Wang et al. ............ | 726/23 |
| 2013/0268357 A1* | 10/2013 | Heath ..................... | H04L 63/00 705/14.53 |

OTHER PUBLICATIONS

International Search Report and Written Opinion issued by the International Searching Authority for Application No. PCT/US2014/023477, dated Jul. 14, 2014 (8 pages).

Mateski, M. et al., "Cyber Threat Metrics," Sandia Report, SAND2012-2427 Unlimited Release, Printed Mar. 2012, 28 pages.

Extended European Search Report issued by the European Patent Office for Application No. 14767490.7 dated Jul. 19, 2016 (8 pages).

Imada, M., et al., "A Detection Method of Privacy Violation on Social Networking Services," The Institute of Electronics, Information and Communication Engineers, vol. 108, No. 258, pp. 71-76 (Oct. 16, 2008).

Jagatic, T. N., et al., "Social Phishing," Communication of the ACM, vol. 50, No. 10, pp. 94-100 (Oct. 1, 2007).

Japanese Office Action issued by the Japan Patent Office for Application No. 2016-501242 dated Sep. 20, 2016 (8 pages).

McAfee, "Attackers File (No. 23): Threats Lurking in the Internet," Computerworld, IDG Interactive, Inc., vol. 7, No. 11, pp. 34-37 (Nov. 1, 2010).

Okatani, Mitsugu, "Redefinition of Threats Accompanying Compositional Change in the Diversified Environment and Measure Approach," Proceedings of the IEICE General Conference 2011 Communication 1, The Institute of Electronics, Information and Communication Engineers, pp. SS-24-SS-27 (Feb. 28, 2011).

Sood, A. K., et al., "Targeted Cyberattacks: A Superset of Advanced Persistent Threats," IEEE Service Center, Security & Privacy, vol. 11, No. 1, pp. 54-61 (Jan. 1, 2013).

Notification of the first Office Action in Chinese Application No. 201480011489.0, dated Jun. 8, 2017, 19 pages.

Notification of the second Office Action in Chinese Application No. 201480011489.0, dated Jan. 15, 2018, 12 pages.

* cited by examiner

TECHNIQUES FOR PREDICTING AND PROTECTING SPEARPHISHING TARGETS

FIELD OF THE DISCLOSURE

The present disclosure relates generally to network security and, more particularly, to techniques for predicting and protecting spearphishing targets.

BACKGROUND OF THE DISCLOSURE

Spearphishing is an email spoofing technique and one of the more prevalent ways to target a specific organization or entity to seek unauthorized access to confidential data. Attacks typically begin with a reconnaissance phase in which perpetrators identify appropriate recipients for spearphishing emails. These targets may comprise individuals that are carefully chosen based on information, for example, relating to their roles in the specific organization or entity, which may directly correspond with their likelihood of access to confidential data. It is also common for perpetrators to indirectly target a specific organization or entity by spearphishing consultants or contractors, who are not employees of the organization or entity, but may nevertheless have access to confidential data. However, most organizations or entities are typically unaware of which employees, consultants, or contractors would be likely targets of spearphishing schemes. Conventional computer security techniques lack intelligence and capacity to predict and protect likely spearphishing targets.

In view of the foregoing, it may be understood that there may be significant problems and shortcomings associated with conventional spearphishing security technologies.

SUMMARY OF THE DISCLOSURE

Techniques for predicting and protecting spearphishing targets are disclosed. In one particular exemplary embodiment, the techniques may be realized as a system for predicting and protecting spearphishing targets. The system may comprise one or more processors communicatively coupled to a network. The one or more processors may be configured to identify one or more potential spearphishing targets based on information from an organization, receive additional information associated with the one or more potential spearphishing targets and the organization from publicly available sources, determine a threat level of a spearphishing attack on the one or more potential spearphishing targets based on the information from the organization and the additional information, and generate a report of the one or more potential spearphishing targets and the threat level associated with the one or more potential spearphishing targets.

In accordance with other aspects of this particular embodiment, the information from an organization may comprise a list of employees, contractors, and consultants associated with the organization.

In accordance with further aspects of this particular embodiment, the additional information may be received as a result of one or more automated searches.

In accordance with additional aspects of this particular embodiment, the additional information may comprise at least one of profile information associated with the one or more potential targets, information from a website associated with the organization, and information from professional and social networking sites.

In accordance with other aspects of this particular embodiment, the threat level of the spearphishing attack may be ranked according to organizational security interests and preferences.

In accordance with further aspects of this particular embodiment, the one or more processors may further comprise implementing at least one security measure to protect against a spearphishing attack. In some embodiments, implementing the at least one security measure may comprise minimizing disclosure of publicly available information associated with the organization. In other embodiments, implementing the at least one security measure may comprise enhancing a security posture of the one or more potential spearphishing targets, where enhancing a security posture may comprise at least one of requiring additional authentication factors, providing security monitoring, and limiting functionality of devices or machines associated with the one or more potential spearphishing targets.

In another particular embodiment, the techniques may be realized as a method for predicting and protecting spearphishing targets. The may comprise identifying, using at least one computer processor, one or more potential spearphishing targets based on information from an organization, receiving additional information associated with the one or more potential spearphishing targets and the organization from publicly available sources, determining a threat level of a spearphishing attack on the one or more potential spearphishing targets based on the information from the organization and the additional information, and generating a report of the one or more potential spearphishing targets and the threat level associated with the one or more potential spearphishing targets.

In yet another particular embodiment, the techniques may be realized as a system for predicting and protecting spearphishing targets. The system may comprise one or more processors communicatively coupled to a network. The one or more processors may be configured to identify new information of interest associated with an organization, predict one or more potential spearphishing targets associated with the organization based on the new information of interest, generate a report of the one or more potential spearphishing targets to protect against spearphishing attacks.

In accordance with other aspects of this particular embodiment, the new information of interest associated with an organization may comprise at least one of a product line information, a press release, organization sector information, current world news, information associated with recent domestic or international security breaches, merger information, organization rumors, and organizational announcements.

In accordance with further aspects of this particular embodiment, predicting the one or more potential spearphishing targets is further based on additional information from profile information received from at least one of a professional and social networking site, an organization's website, or a third party data source.

In accordance with additional aspects of this particular embodiment, the one or more processors may further comprise implementing at least one security measure to protect against a spearphishing attack. In some embodiments, implementing the at least one security measure may comprise minimizing disclosure of publicly available information associated with the organization. In other embodiments, implementing the at least one security measure may comprise enhancing a security posture of the one or more potential spearphishing targets, where enhancing a security posture may comprise at least one of requiring additional authentication factors, providing security monitoring, and limiting functionality of devices or machines associated with the one or more potential spearphishing targets.

The present disclosure will now be described in more detail with reference to particular embodiments thereof as shown in the accompanying drawings. While the present disclosure is described below with reference to particular embodiments, it should be understood that the present disclosure is not limited thereto. Those of ordinary skill in the art having access to the teachings herein will recognize additional implementations, modifications, and embodiments, as well as other fields of use, which are within the scope of the present disclosure as described herein, and with respect to which the present disclosure may be of significant utility.

BRIEF DESCRIPTION OF THE DRAWINGS

In order to facilitate a fuller understanding of the present disclosure, reference is now made to the accompanying drawings, in which like elements are referenced with like numerals. These drawings should not be construed as limiting the present disclosure, but are intended to be exemplary only.

DETAILED DESCRIPTION OF EXEMPLARY EMBODIMENTS

Figure 1:
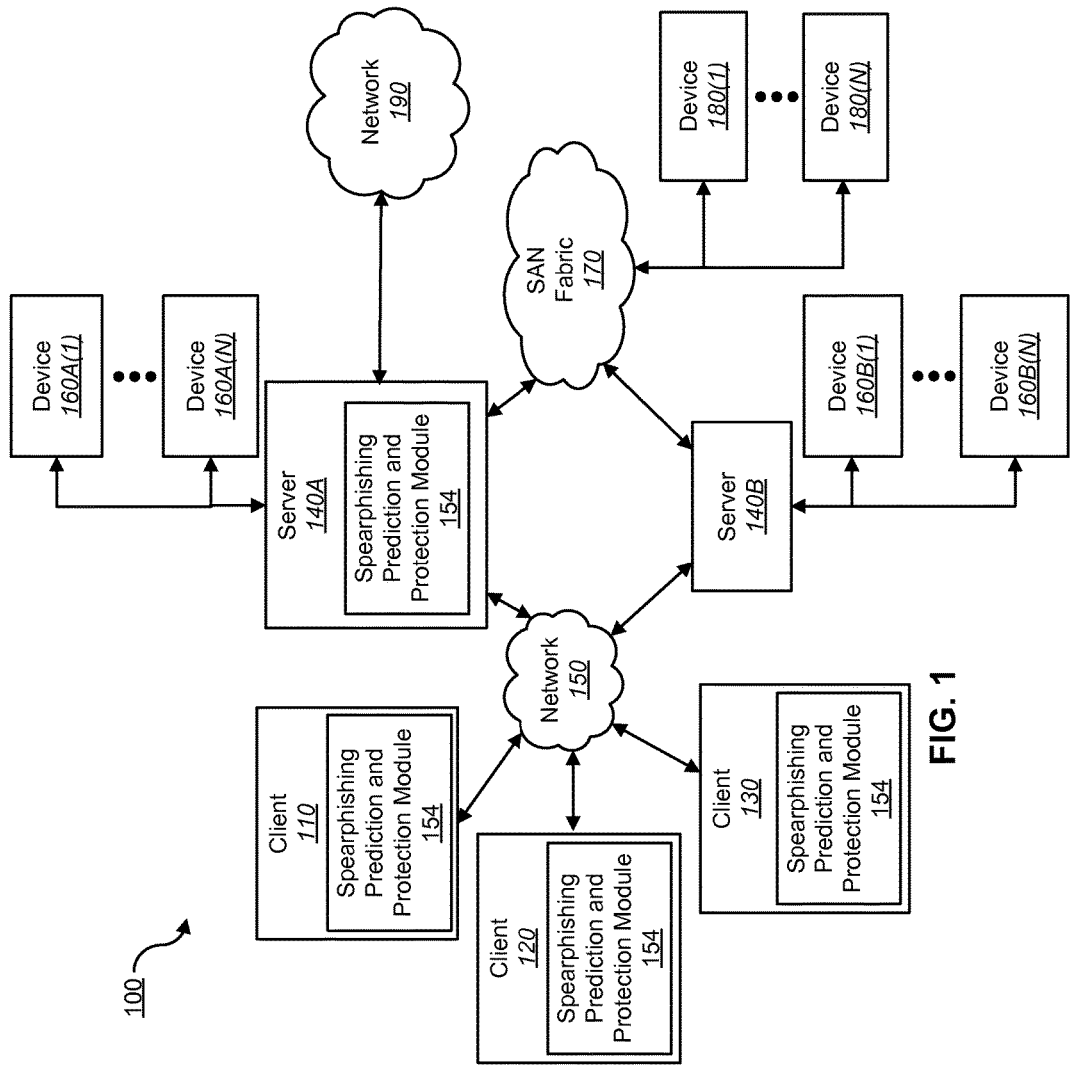
FIG. 1 shows a block diagram depicting a network architecture for predicting and protecting spearphishing targets in accordance with an embodiment of the present disclosure.

FIG. 1 shows a block diagram depicting a network architecture for predicting and protecting spearphishing targets in accordance with an embodiment of the present disclosure. FIG. 1 is a simplified view of network architecture 100, which may include additional elements that are not depicted. Network architecture 100 may contain client systems 110, 120 and 130, as well as servers 140A and 140B (one or more of which may be implemented using computer system 200 shown in FIG. 2). Client systems 110, 120 and 130 may be communicatively coupled to a network 150. Server 140A may be communicatively coupled to storage devices 160A(1)-(N), and server 140B may be communicatively coupled to storage devices 160B(1)-(N). Servers 140A and 140B may contain a management module (e.g., Spearphishing prediction and protection module 154 of server 140A). Servers 140A and 140B may be communicatively coupled to a SAN (Storage Area Network) fabric 170. SAN fabric 170 may support access to storage devices 180(1)-(N) by servers 140A and 140B, and by client systems 110, 120 and 130 via network 150.

Figure 2:
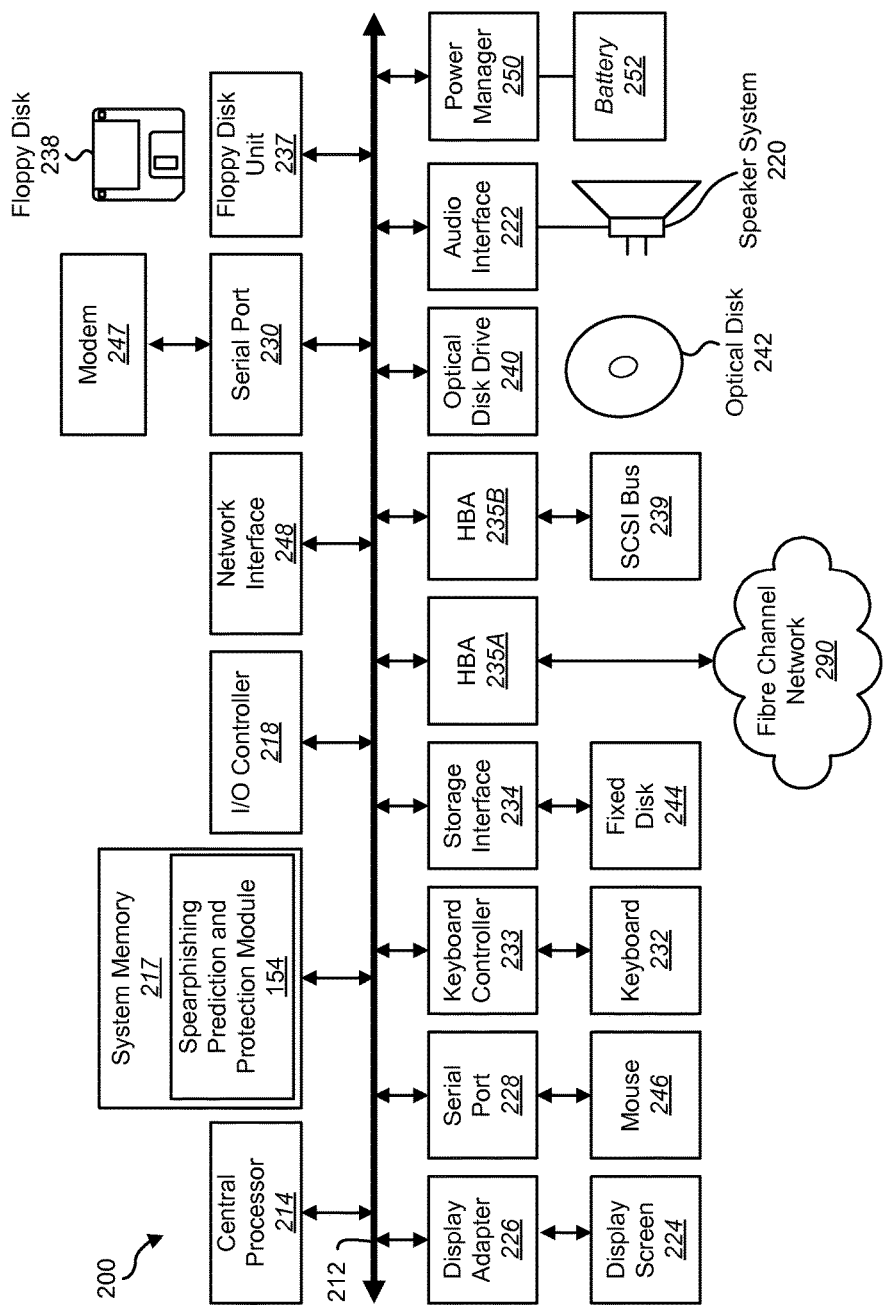
FIG. 2 depicts a block diagram of a computer system for predicting and protecting spearphishing targets in accordance with an embodiment of the present disclosure.

With reference to computer system 200 of FIG. 2, modem 247, network interface 248, or some other method may be used to provide connectivity from one or more of client systems 110, 120 and 130 to network 150. Client systems 110, 120 and 130 may be able to access information on server 140A or 140B using, for example, a web browser or other client software (not shown). Such a client may allow client systems 110, 120 and 130 to access data hosted by server 140A or 140B or one of storage devices 160A(1)-(N), 160B(1)-(N), and/or 180(1)-(N).

Networks 150 and 190 may be local area networks (LANs), wide area networks (WANs), the Internet, cellular networks, satellite networks, or other networks that permit communication between clients 110, 120, 130, servers 140, and other devices communicatively coupled to networks 150 and 190. Networks 150 and 190 may further include one, or any number, of the exemplary types of networks mentioned above operating as a stand-alone network or in cooperation with each other. Networks 150 and 190 may utilize one or more protocols of one or more clients or servers to which they are communicatively coupled. Networks 150 and 190 may translate to or from other protocols to one or more protocols of network devices. Although networks 150 and 190 are each depicted as one network, it should be appreciated that according to one or more embodiments, networks 150 and 190 may each comprise a plurality of interconnected networks.

Storage devices 160A(1)-(N), 160B(1)-(N), and/or 180(1)-(N) may be network accessible storage and may be local, remote, or a combination thereof to server 140A or 140B. Storage devices 160A(1)-(N), 160B(1)-(N), and/or 180(1)-(N) may utilize a redundant array of inexpensive disks ("RAID"), magnetic tape, disk, a storage area network ("SAN"), an internet small computer systems interface ("iSCSI") SAN, a Fibre Channel SAN, a common Internet File System ("CIFS"), network attached storage ("NAS"), a network file system ("NFS"), optical based storage, or other computer accessible storage. Storage devices 160A(1)-(N), 160B(1)-(N), and/or 180(1)-(N) may be used for backup or archival purposes.

According to some embodiments, clients 110, 120, and 130 may be smartphones, PDAs, desktop computers, a laptop computers, servers, other computers, or other devices coupled via a wireless or wired connection to network 150. Clients 110, 120, and 130 may receive data from user input, a database, a file, a web service, and/or an application programming interface.

Servers 140A and 140B may be application servers, archival platforms, backup servers, network storage devices, media servers, email servers, document management platforms, enterprise search servers, or other devices communicatively coupled to network 150. Servers 140A and 140B may utilize one of storage devices 160A(1)-(N), 160B(1)-(N), and/or 180(1)-(N) for the storage of application data, backup data, or other data. Servers 140A and 140B may be hosts, such as an application server, which may process data traveling between clients 110, 120, and 130 and a backup platform, a backup process, and/or storage. According to some embodiments, servers 140A and 140B may be platforms used for backing up and/or archiving data. One or more portions of data may be backed up or archived based on a backup policy and/or an archive applied, attributes associated with the data source, space available for backup, space available at the data source, or other factors.

According to some embodiments, clients 110, 120, and/or 130 may contain one or more portions of software for predicting and protecting spearphishing targets such as, for example, spearphishing prediction and protection module 154. As illustrated, one or more portions of spearphishing prediction and protection module 154 may reside at a network centric location. For example, server 140A may be a server, a firewall, a gateway, or other network element that may perform one or more actions to predict and protect spearphishing targets. According to some embodiments, network 190 may be an external network (e.g., the Internet) and server 140A may be a gateway or firewall between one or more internal components and clients and the external network.

Spearphishing prediction and protection module 154 may predict potential spearphishing targets and implement one or more various remediation techniques to enhance security based on identification of such potential targets. As discussed above, computer security techniques lack intelligence and capacity to predict and protect likely spearphishing targets. For example, spearphishers may seek confidential data of an organization by targeting direct employees or even consultants or contractors that work indirectly with the organization. Because most organizations are typically unaware which of their employees, consultants, or contractors would be likely targets of spearphishing schemes, and do not typically provide a robust system to predict and protect against spearphishing, valuable information and data of the organization or entity may be easily compromised.

Spearphishing prediction and protection module 154 may identify a potential spearphishing target in a variety of different ways. In some embodiments, potential spearphishing targets may be identified by obtaining a list of employees, contractors, or consultants from an organization. Using this list, one or more searches may be conducted for each employee, contractor, or consultant associated with the organization. These searches may involve determining company-related information that is visible to the general public and associated with these individuals. If a list of consultants or contractors is not available (since they are not direct employees of the organization), one or more preliminary searches may be conducted to determine contractors and consultants associated with the organization. In general, as part of their business, contractors or consultants who are not employed directly by an organization may frequently advertise their business relationship with the organization. Spearphishing prediction and protection module 154 may use this information to determine a potential list of contractors or consultants that have associations with an organization of interest.

In some embodiments, it should be appreciated that list of potential targets and associated search functions may be achieved through automation with limited, if any, manual processing. For example, a web crawler may be used to perform one or more of these and other related searches. Other search tools may also be used and automated. For example, an application programming interface (API) may be created and customized using one or more search engines that automate searches and provide machine-consumable results, which may be particularly useful in situations where use of web crawlers may be limited for certain web sites. Use of lexical analysis may be used to enhance searches or fine-tune search results. For example, matching confidential search terms to the text of search results may also be achieved through these or other automation techniques to help identify the list of employees, contractors, or consultants as potential spearphishing targets or process information and data associated with these individuals.

Once this list of employees, contractors, or consultants is determined, spearphishing prediction and protection module 154 may mine and search, using a web crawler or similar search tool, to find additional information associated with these individuals. For example, spearphishing prediction and protection module 154 may search profiles of these individuals on publicly available websites, such as LinkedIn, Viadeo, Facebook, Twitter, Tumblr, etc. Spearphishing prediction and protection module 154 may also filter these profiles for information associated with the organization of interested. In one example, an employee of an organization may have blogged or posted information regarding the employer organization's new product line, merger, or other similar business news or updates. Such information may be used by perpetrators to gain access to confidential data or information of the organization via spearphishing attacks.

It should be appreciated that spearphishing prediction and protection module 154 may search for organizational information before determining a list of potential targets associated with an organization. For example, spearphishing prediction and protection module 154 may use a web crawler or other search tool to search for publicly disclosed information associated with an organization. This information may include product line information, press releases, organization sector information, or other similar information from an organization's website, third party website, or other information source. Spearphishing prediction and protection module 154 may search for potential targets associated with such organization information. For example, spearphishing prediction and protection module 154 may search profiles of these individuals on publicly available websites and blog sites, such as LinkedIn, Viadeo, Facebook, Twitter, Tumblr, etc.

It should be appreciated that additional searches may be provided for employees, contractors, and consultants associated with government services. For example, spearphishing prediction and protection module 154 may search current news and world events, domestic and international security breaches (e.g., Chinese dissidents), or other information associated with government service.

Spearphishing prediction and protection module 154 may further search for sensitive disclosed information, including, but not limited to, email addresses, company phone numbers, private company information, or other similar information. Again, such information may be used by perpetrators to gain access to confidential data or information of the organization via spearphishing attacks. For example, perpetrators may use such information to lure potential targets to give (directly or indirectly) even more information about an organization (e.g., its structure, projects, teams), which may lead to more severe organization compromises.

By searching for this information and figuring out how much or how little information is visible to the public (and therefore to perpetrators), it may be possible to preempt spearphishing attacks before they happen or reduce its impact when such breaches occur.

In some embodiments, once it is determined that there is sufficient information visible to the public that may pose a risk to attack or if an attack has been identified, spearphishing prediction and protection module 154 may rank the threat by level of importance to an organization. Spearphishing prediction and protection module 154 may provide a multitude of security measures to protect confidential information of the organization.

For example, in some embodiments, excessive disclosures of organization-related information that make individuals more susceptible to attack may be removed from visibility. For example, this may include information found on an organization's website, information posted by an employee, contractor, or consultant on another website, or information found on a third-party website. It should be appreciated that removing some of this information may require cooperation with other individuals or entities.

Another security measure to be taken in response to excessive disclosures of sensitive information by an organization or entity may be to generally enhance security posture of an employee, contractor, or consultant associated with the organization. For instance, spearphishing prediction and protection module 154 may be used by an organization to require extra authentication factors, such as biometrics, security tokens (e.g., VIP tokens), or similar authentic features, to provide additional security. Another enhanced security posture may include installation of additional security monitoring of data traffic at various servers, computers, gateways, or machines of an organization. This may include installation of data loss prevention software and/or event logging techniques offered by third-party providers.

Locking down various one or more devices of an organization may also provide an enhanced security posture. For example, this may include inhibiting remote computing access, allowing installation of a whitelist of applications, reducing or eliminating use of administrative privileges, or installing third-party solutions for restricting or limiting access to system security settings.

Other enhanced security postures may also include requiring susceptible users to install security software directly on their devices or machines, disallowing individuals from use of personal devices for organizational purposes, allowing only organization-issued devices and machines that have customized security features, upgrading to less susceptible operating systems, increasing password strength requirements, decreasing amount of time passwords are valid, or requiring whole-disk encryption. These security measures may be applied at varying degrees based on the level of risk posed by the individual or by risk to an organization.

By using spearphishing prediction and protection module 154, a number of advantages may be realized. For example, spearphishing prediction and protection module 154 may provide techniques for eliminating or reducing effects of spearphishing attacks. Ultimately, the techniques presented may provide greater efficiency, lower cost, and greater reliability in identifying potential spearphishing targets and protection from spearphishing attacks when compared to traditional methods and techniques.

FIG. 2 depicts a block diagram of a computer system for predicting and protecting spearphishing targets in accordance with an embodiment of the present disclosure. Computer system 200 is suitable for implementing techniques in accordance with the present disclosure. Computer system 200 may include a bus 212 which may interconnect major subsystems of computer system 210, such as a central processor 214, a system memory 217 (e.g. RAM (Random Access Memory), ROM (Read Only Memory), flash RAM, or the like), an Input/Output (I/O) controller 218, an external audio device, such as a speaker system 220 via an audio output interface 222, an external device, such as a display screen 224 via display adapter 226, serial ports 228 and 230, a keyboard 232 (interfaced via a keyboard controller 233), a storage interface 234, a floppy disk drive 237 operative to receive a floppy disk 238, a host bus adapter (HBA) interface card 235A operative to connect with a Fibre Channel network 290, a host bus adapter (HBA) interface card 235B operative to connect to a SCSI bus 239, and an optical disk drive 240 operative to receive an optical disk 242. Also included may be a mouse 246 (or other point-and-click device, coupled to bus 212 via serial port 228), a modem 247 (coupled to bus 212 via serial port 230), network interface 248 (coupled directly to bus 212), power manager 250, and battery 252.

Bus 212 allows data communication between central processor 214 and system memory 217, which may include read-only memory (ROM) or flash memory (neither shown), and random access memory (RAM) (not shown), as previously noted. The RAM is may be the main memory into which the operating system and application programs may be loaded. The ROM or flash memory can contain, among other code, the Basic Input-Output system (BIOS) which controls basic hardware operation such as the interaction with peripheral components. Applications resident with computer system 210 may be stored on and accessed via a computer readable medium, such as a hard disk drive (e.g., fixed disk 244), an optical drive (e.g., optical drive 240), a floppy disk unit 237, or other storage medium. For example, spearphishing prediction and protection module 154 may be resident in system memory 217.

Storage interface 234, as with the other storage interfaces of computer system 210, can connect to a standard computer readable medium for storage and/or retrieval of information, such as a fixed disk drive 244. Fixed disk drive 244 may be a part of computer system 210 or may be separate and accessed through other interface systems. Modem 247 may provide a direct connection to a remote server via a telephone link or to the Internet via an internet service provider (ISP). Network interface 248 may provide a direct connection to a remote server via a direct network link to the Internet via a POP (point of presence). Network interface 248 may provide such connection using wireless techniques, including digital cellular telephone connection, Cellular Digital Packet Data (CDPD) connection, digital satellite data connection or the like.

Many other devices or subsystems (not shown) may be connected in a similar manner (e.g., document scanners, digital cameras and so on). Conversely, all of the devices shown in FIG. 2 need not be present to practice the present disclosure. The devices and subsystems can be interconnected in different ways from that shown in FIG. 2. Code to implement the present disclosure may be stored in computer-readable storage media such as one or more of system memory 217, fixed disk 244, optical disk 242, or floppy disk 238. Code to implement the present disclosure may also be received via one or more interfaces and stored in memory. The operating system provided on computer system 210 may be MS-DOS®, MS-WINDOWS®, OS/2®, OS X®, UNIX®, Linux®, or another known operating system.

Power manager 250 may monitor a power level of battery 252. Power manager 250 may provide one or more APIs (Application Programming Interfaces) to allow determination of a power level, of a time window remaining prior to shutdown of computer system 200, a power consumption rate, an indicator of whether computer system is on mains (e.g., AC Power) or battery power, and other power related information. According to some embodiments, APIs of power manager 250 may be accessible remotely (e.g., accessible to a remote backup management module via a network connection). According to some embodiments, battery 252 may be an Uninterruptable Power Supply (UPS) located either local to or remote from computer system 200. In such embodiments, power manager 250 may provide information about a power level of an UPS.

Figure 3:
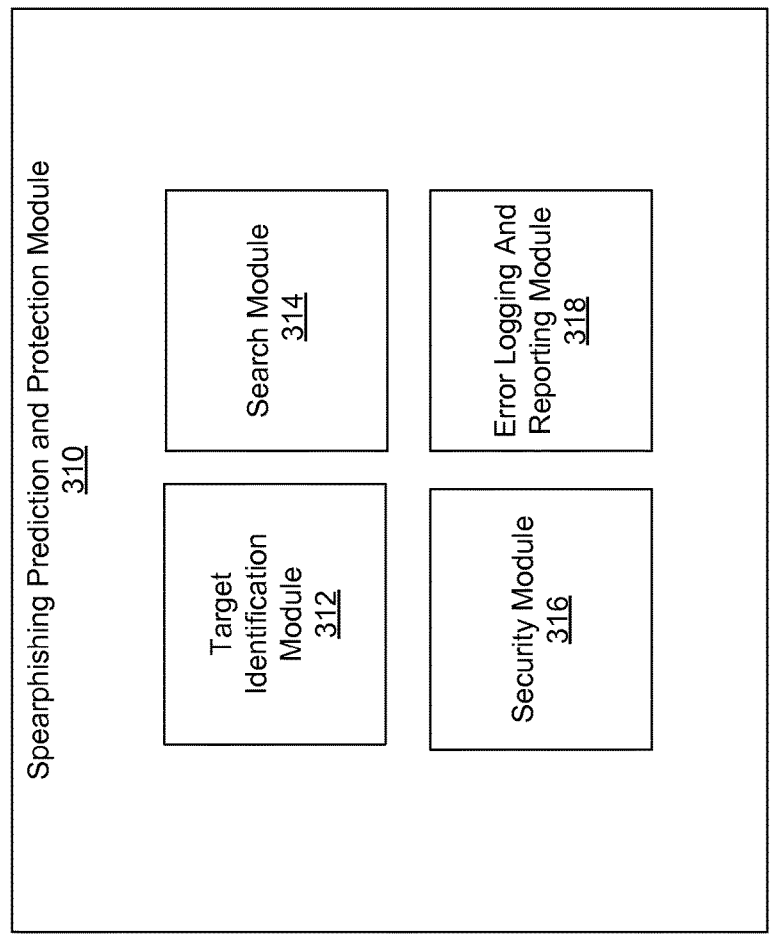
FIG. 3 shows a module for predicting and protecting spearphishing targets in accordance with an embodiment of the present disclosure.

FIG. 3 shows a module for predicting and protecting spearphishing targets in accordance with an embodiment of the present disclosure. Referring to FIG. 3, there is shown a spearphishing prediction and protection module 310 in accordance with an embodiment of the present disclosure. As illustrated, the spearphishing prediction and protection 310 may contain one or more components including target identification module 312, search module 314, security module 316, and error logging and reporting module 318.

The description below describes network elements, computers, and/or components of a system and method for predicting and protecting spearphishing targets that may include one or more modules. As used herein, the term "module" may be understood to refer to computing software, firmware, hardware, and/or various combinations thereof. Modules, however, are not to be interpreted as software which is not implemented on hardware, firmware, or recorded on a processor readable recordable storage medium (i.e., modules are not software per se). It is noted that the modules are exemplary. The modules may be combined, integrated, separated, and/or duplicated to support various applications. Also, a function described herein as being performed at a particular module may be performed at one or more other modules and/or by one or more other devices instead of or in addition to the function performed at the particular module. Further, the modules may be implemented across multiple devices and/or other components local or remote to one another. Additionally, the modules may be moved from one device and added to another device, and/or may be included in both devices.

Target identification module 312 may be used for determining targets of spearphishing attacks, as described above. For example, target identification module 312 may identify or predict potential spearphishing targets using techniques analogous to spearphishing perpetrators. Search module 314 may be used to provide the aforementioned mining and searching features as described above. For example, search module 314 may search for publicly available data or information relevant for target identification and security implementation. Security module 316 may be used to provide a host of security measures to prevent or reduce impact of spearphishing attacks, as described above. Error logging and reporting module 318 may produce logs, reports, or other information associated with predicting and protecting targets of spearphishing.

Figure 4:
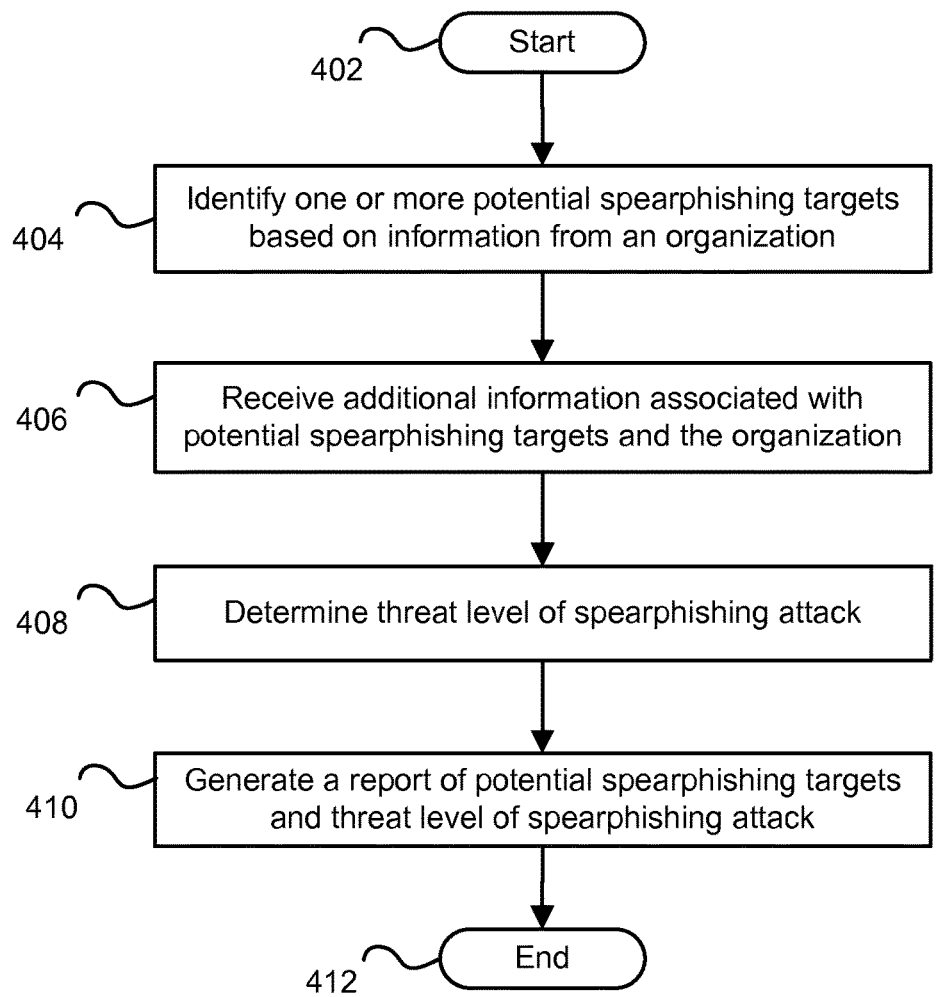
FIG. 4 depicts a flowchart of a method for predicting and protecting spearphishing targets in accordance with an embodiment of the present disclosure.

FIG. 4 depicts a flowchart of a method for predicting and protecting spearphishing targets in accordance with an embodiment of the present disclosure. The exemplary method 400 is provided by way of example, as there are a variety of ways to carry out methods disclosed herein. The method 400 shown in FIG. 4 may be executed or otherwise performed by one or a combination of various systems. The method 400 is described below as carried out by at least system 100 in FIG. 1, architecture 200 in FIG. 2, and module 310 in FIG. 3, by way of example, and various elements of system 100 are referenced in explaining the exemplary method of FIG. 4. Each block shown in FIG. 4 represents one or more processes, methods, or subroutines carried in the exemplary method 400. A non-transitory computer-readable medium comprising code, which when performed by a computer, may perform the acts of the method 400 may also be provided. Referring to FIG. 4, the exemplary method 400 may begin at block 402.

At block 402, the method 400 may begin.

At block 404, one or more potential spearphishing targets may be identified based on information from an organization. In some embodiments, the information from an organization may comprise a list of employees, contractors, and consultants associated with the organization. Other information may be used, as described above, to identify the one or more potential spearphishing targets.

At block 406, additional information associated with the one or more potential spearphishing targets and the organization may be received from publicly available sources. For example, the additional information may be received as a result of one or more automated searches. In some embodiments, the additional information may comprise profile information associated with the one or more potential targets. In other embodiments, the additional information may comprise information from professional and social networking sites.

At block 408, a threat level of a spearphishing attack on the one or more potential spearphishing targets may be determined based on the information from the organization and the additional information. In some embodiments, the threat level of the spearphishing attack may be ranked according to organizational security interests and preferences.

At block 410, a report may be generated. For example, a report of the one or more potential spearphishing targets and the threat level associated with the one or more potential spearphishing targets may be generated to be used in protecting against a spearphishing attack.

It should be appreciated that method 400 may also comprise implementing at least one security measure to protect against a spearphishing attack. In some embodiments, the at least one security measure may comprise minimizing disclosure of publicly available information associated with the organization. For example, the at least one security measure may comprise minimizing disclosure of publicly available information associated with the organization, as described above. The at least one security measure may also comprise enhancing security posture of the one or more potential spearphishing targets, which may include, but not limited to, requiring additional authentication factors, providing security monitoring, and limiting functionality of devices or machines associated with the one or more potential spearphishing targets. These and other enhanced security postures may be used, as described above.

At block 412, the method 400 may end.

Figure 5:
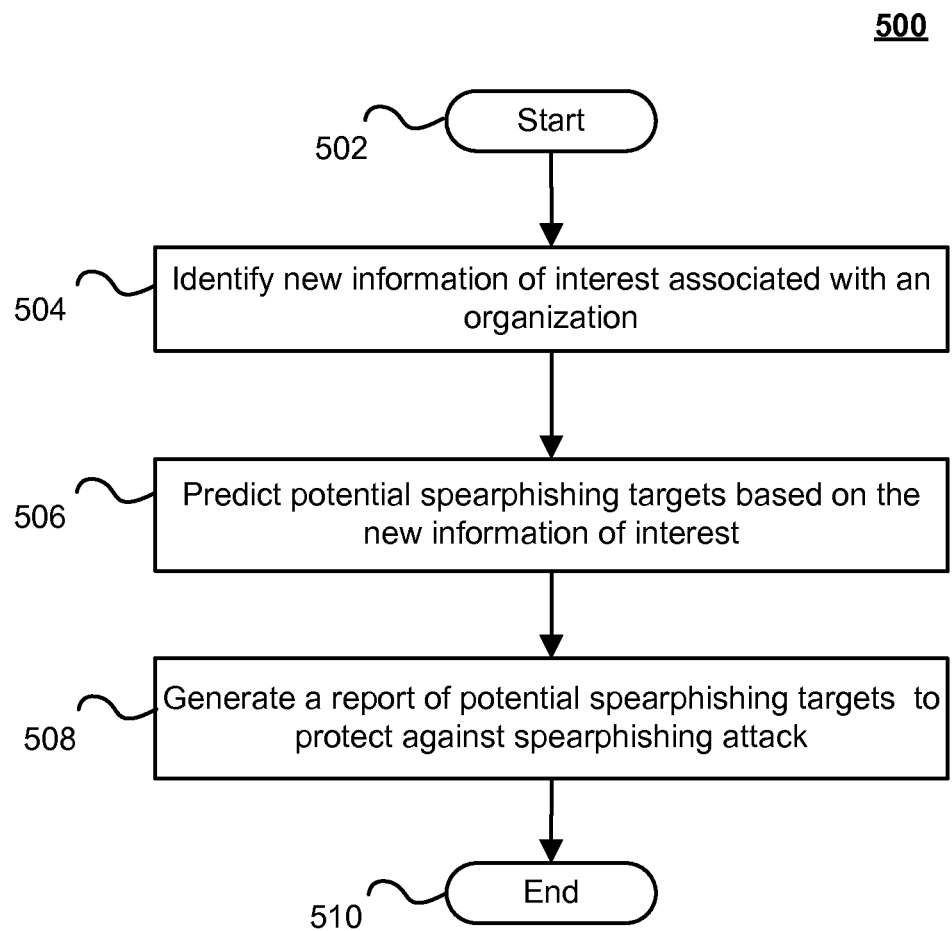
FIG. 5 depicts a flowchart of a method for predicting and protecting spearphishing targets in accordance with another embodiment of the present disclosure.

FIG. 5 depicts a flowchart of a method for predicting and protecting spearphishing targets in accordance with another embodiment of the present disclosure. The exemplary method 500 is provided by way of example, as there are a variety of ways to carry out methods disclosed herein. The method 500 shown in FIG. 5 may be executed or otherwise performed by one or a combination of various systems. The method 500 is described below as carried out by at least system 100 in FIG. 1, architecture 200 in FIG. 2, and module 310 in FIG. 3, by way of example, and various elements of system 100 are referenced in explaining the exemplary method of FIG. 5. Each block shown in FIG. 5 represents one or more processes, methods, or subroutines carried in the exemplary method 400. A non-transitory computer-readable medium comprising code, which when performed by a computer, may perform the acts of the method 500 may also be provided. Referring to FIG. 5, the exemplary method 500 may begin at block 502.

At block 502, the method 500 may begin.

At block 504, new information or interest associated with an organization may be identified. In some embodiments, the new information from an organization may comprise at least one of a product line information, a press release, organization sector information, current world news, information associated with recent domestic or international security breaches, merger information, organization rumors, and organizational announcements. In other embodiments, the new information may be received as a result of one or more automated searches.

At block 506, one or more potential spearphishing targets associated with the organization may be predicted based on the new information of interest. In some embodiments, predicting the one or more potential spearphishing targets may further based on additional information from profile information received from at least one of a professional and social networking site, an organization's website, or a third party data source.

At block 508, a report may be generated. For example, a report of the one or more potential spearphishing targets and the threat level associated with the one or more potential spearphishing targets may be generated to be used in protecting against a spearphishing attack.

It should be appreciated that method 500 may also comprise implementing at least one security measure to protect against a spearphishing attack. In some embodiments, the at least one security measure may comprise minimizing disclosure of publicly available information associated with the organization. For example, the at least one security measure may comprise minimizing disclosure of publicly available information associated with the organization, as described above. The at least one security measure may also comprise enhancing security posture of the one or more potential spearphishing targets, which may include, but not limited to, requiring additional authentication factors, providing security monitoring, and limiting functionality of devices or machines associated with the one or more potential spearphishing targets. These and other enhanced security postures may be used, as described above.

At block 510, the method 500 may end.

At this point it should be noted that predicting and protecting spearphishing targets in accordance with the present disclosure as described above typically involves the processing of input data and the generation of output data to some extent. This input data processing and output data generation may be implemented in hardware or software. For example, specific electronic components may be employed in a spearphishing prediction and protection module or similar or related circuitry for implementing the functions associated with predicting and protecting spearphishing targets in accordance with the present disclosure as described above. Alternatively, one or more processors operating in accordance with instructions may implement the functions associated with predicting and protecting spearphishing targets in accordance with the present disclosure as described above. If such is the case, it is within the scope of the present disclosure that such instructions may be stored on one or more processor readable storage media (e.g., a magnetic disk or other storage medium), or transmitted to one or more processors via one or more signals embodied in one or more carrier waves.

The present disclosure is not to be limited in scope by the specific embodiments described herein. Indeed, other various embodiments of and modifications to the present disclosure, in addition to those described herein, will be apparent to those of ordinary skill in the art from the foregoing description and accompanying drawings. Thus, such other embodiments and modifications are intended to fall within the scope of the present disclosure. Further, although the present disclosure has been described herein in the context of a particular implementation in a particular environment for a particular purpose, those of ordinary skill in the art will recognize that its usefulness is not limited thereto and that the present disclosure may be beneficially implemented in any number of environments for any number of purposes. Accordingly, the claims set forth below should be construed in view of the full breadth and spirit of the present disclosure as described herein.

The invention claimed is:

1. A system for predicting and protecting spearphishing targets comprising:
one or more hardware computer processors communicatively coupled to a network,
wherein the one or more processors are configured to:
perform at least one first automated internet search for public information associated with an organization;
perform at least one second automated internet search for individuals associated with the organization, wherein the public information associated with the organization is different from the individuals associated with the organization;
generate a list of individuals associated with the organization based on the at least one second automated internet search;
predict one or more individuals that are potential spearphishing targets, wherein the predicting the one or more individuals that are potential spearfishing targets comprises performing at least one third automated internet search based on a result of the at least one first automated search, the list of individuals associated with the organization from the at least one second automated internet search, and using predetermined confidential information associated with the organization;
perform at least one fourth automated internet search for additional information associated with the one or more individuals that are potential spearphishing targets and the organization from publicly available sources, wherein the publicly available sources comprises professional and social networking sites associated with the one or more individuals that are potential spearphishing targets;
prior to initiation of a spearphishing attack targeting the one or more individuals, take one or more actions to preempt a spearphishing attack before it occurs, whereby the one or more processors are configured to:
determine a threat level of a potential spearphishing attack on the one or more individuals that are potential spearphishing targets based on a level of publicly available information and the additional information; and
generate a report of the one or more individuals that are potential spearphishing targets and the threat level associated with the one or more individuals that are potential spearphishing targets; and
implement at least one security measure to protect against a spearphishing attack, wherein implementing the at least one security measure comprises removing information from one or more websites, such that an attacker does not identify the one or more individuals as a potential target.

2. The system of claim 1, wherein the list of individuals comprises a list of employees, contractors, and consultants associated with the organization.

3. The system of claim 1, wherein the additional information comprises at least one of profile information associated with the one or more individuals that are potential targets, information from a website associated with the organization, and information from the professional and social networking sites.

4. The system of claim 1, wherein the threat level of the spearphishing attack is ranked according to organizational security interests and preferences.

5. The system of claim 1, wherein implementing the at least one security measure comprises enhancing a security posture of the one or more individuals that are potential spearphishing targets, wherein enhancing a security posture comprises at least one of requiring additional authentication factors, providing security monitoring, and limiting functionality of devices or machines associated with the one or more individuals that are potential spearphishing targets.

6. A method for predicting and protecting spearphishing targets comprising:
  performing at least one first automated internet search for public information associated with an organization;
  performing at least one second automated internet search for individuals associated with the organization, wherein the public information associated with the organization is different from the individuals associated with the organization;
  generating a list of individuals associated with the organization based on the at least one second automated internet search;
  predicting, using at least one hardware computer processor, one or more individuals that are potential spearphishing targets, wherein the predicting the one or more individuals that are potential spearphishing targets comprises performing at least one third automated internet search based on a result of the at least one first automated search, the list of individuals associated with the organization from the at least one second automated internet search, and using predetermined confidential information associated with the organization;
  performing at least one fourth automated internet search for additional information associated with the one or more individuals that are potential spearphishing targets and the organization from publicly available sources, wherein the publicly available sources comprises professional and social networking sites associated with the one or more individuals that are potential spearphishing targets;
  prior to initiation of a spearphishing attack targeting the one or more individuals take one or more actions to preempt a spearphishing attack before it occurs, said one or more actions comprising:
    determining a threat level of a potential spearphishing attack on the one or more individuals that are potential spearphishing targets based on a level of publicly available information and the additional information; and
    generating a report of the one or more individuals that are potential spearphishing targets and the threat level associated with the one or more individuals that are potential spearphishing targets and
    implementing at least one security measure to protect against a spearphishing attack, wherein implementing the at least one security measure comprises removing information from one or more websites, such that an attacker does not identify the one or more individuals as a potential target.

7. The method of claim 6, wherein the list of individuals comprises a list of employees, contractors, and consultants associated with the organization.

8. The method of claim 6, wherein the additional information comprises at least one of profile information associated with the one or more individuals that are potential targets, information from a website associated with the organization, and information from the professional and social networking sites.

9. The method of claim 6, wherein the threat level of the spearphishing attack is ranked according to organizational security interests and preferences.

10. The method of claim 6, wherein implementing the at least one security measure comprises enhancing a security posture of the one or more individuals that are potential spearphishing targets, wherein enhancing a security posture comprises at least one of requiring additional authentication factors, providing security monitoring, and limiting functionality of devices or machines associated with the one or more individuals that are potential spearphishing targets.

11. A non-transitory computer-readable storage medium storing a computer program of instructions configured to be readable by at least one computer processor for instructing the at least one computer processor to execute a computer process for performing the method of claim 6.

12. A system for predicting and protecting spearphishing targets comprising:
  one or more hardware computer processors communicatively coupled to a network, wherein the one or more processors are configured to:
    perform at least one first automated internet search for public information associated with an organization;
    perform at least one second automated internet search for individuals associated with the organization, wherein the public information associated with the organization is different from the individuals associated with the organization;
    generate a list of individuals associated with the organization based on the at least one second automated internet search;
    identify new information of interest associated with the organization based on one or more automated third internet searches based on a result of the at least one first automated search, the list of individuals associated with the organization from the at least one second automated internet search, and using confidential predetermined information associated with the organization;
    predict one or more potential individuals that are spearphishing targets associated with the organization based on the new information of interest;
    perform at least one fourth automated internet search for additional information associated with the one or more individuals that are potential spearphishing targets and the organization from publicly available sources, wherein the publicly available sources comprises professional and social networking sites associated with the one or more individuals that are potential spearphishing targets;
    prior to initiation of a spearphishing attack targeting the one or more individuals, take one or more actions to preempt a spearphishing attack before it occurs, whereby the one or more processors are configured to:
      determine a threat level of a potential spearphishing attack on the one or more individuals that are potential spearphishing targets based on a level of publicly available information and the additional information; and
      generate a report of the one or more individuals that are potential spearphishing targets to protect against spearphishing attacks; and implement at least one security measure to protect against a spearphishing attack, wherein implementing the at least one security measure comprises removing information from one or more websites, such that an attacker does not identify the one or more individuals as a potential target.

13. The system of claim 12, wherein the new information of interest associated with an organization comprises at least one of a product line information, a press release, organization sector information, current world news, information associated with recent domestic or international security breaches, merger information, organization rumors, and organizational announcements.

14. The system of claim 12, wherein the additional information comprises profile information received from at least one of the professional and social networking sites, an organization's web site, or a third party data source.

* * * * *